(12) United States Patent
Miura et al.

(10) Patent No.: US 9,701,271 B2
(45) Date of Patent: Jul. 11, 2017

(54) PASSENGER SEAT AIR BAG (71) Applicant: TOYODA GOSEI CO., LTD., Kiyosu-shi, Aichi-ken (JP)

(72) Inventors: Wataru Miura, Kiyosu (JP); Shun Ito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/848,444

(22) Filed: Sep. 9, 2015

(65) Prior Publication Data

US 2016/0082916 A1    Mar. 24, 2016

(30) Foreign Application Priority Data

Sep. 18, 2014 (JP) ................. 2014-190556

(51) Int. Cl.
*B60R 21/2346* (2011.01)
*B60R 21/2338* (2011.01)
*B60R 21/205* (2011.01)
*B60R 21/231* (2011.01)
*B60R 21/215* (2011.01)
*B60R 21/239* (2006.01)

(52) U.S. Cl.
CPC .......... *B60R 21/231* (2013.01); *B60R 21/215* (2013.01); *B60R 21/239* (2013.01); *B60R 21/2338* (2013.01); *B60R 21/2346* (2013.01); *B60R 21/205* (2013.01); *B60R 2021/21537* (2013.01); *B60R 2021/2395* (2013.01); *B60R 2021/23382* (2013.01)

(58) Field of Classification Search
CPC ............ B60R 21/2346; B60R 21/2338; B60R 21/2334; B60R 21/205; B60R 2021/23382
USPC .............................................. 280/743.2, 732
See application file for complete search history.

(56) References Cited

FOREIGN PATENT DOCUMENTS

| JP | H09-030352 A | 2/1997 |
| JP | H09-295545 A | 11/1997 |
| JP | 2000-159045 A | 6/2000 |
| JP | 2008-254500 A | 10/2008 |
| JP | 2008254500 A * | 10/2008 |
| JP | 2013-505166 A | 2/2013 |
| WO | 2011/035199 A1 | 3/2011 |

* cited by examiner

*Primary Examiner* — Keith J Frisby
(74) *Attorney, Agent, or Firm* — Posz Law Group, PLC (57) ABSTRACT

A passenger seat air bag includes: a bag main body; and a tether arranged within the bag main body, wherein: the bag main body includes a passenger side wall portion and a peripheral wall portion, the peripheral wall portion including a gas supply opening so opened up as to enable the inflating gas to flow therethrough and having a peripheral edge mountable onto the storage portion side; the tether has a back end side connected to the vicinity of the center of the passenger side wall portion to thereby restrict the distance of the passenger side wall portion from the gas supply opening; and a cover sheet formed of a belt-shaped flexible sheet member, the front end side of the cover sheet being connected to the front edge side of the gas supply opening, and the back end side thereof being connected to the tether.

7 Claims, 11 Drawing Sheets

PASSENGER SEAT AIR BAG

CROSS-REFERENCE TO RELATED APPLICATION(S)

This application is based upon and claims the benefit of priority from Japanese Patent Application No. 2014-190556, filed on Sep. 18, 2014, the entire contents of which are incorporated herein by reference.

BACKGROUND

1. Field of the Invention

The invention relates to a passenger seat air bag which is folded and stored into a storage portion formed in an instrument panel disposed in front of the passenger seat of a vehicle and, when an inflating gas is supplied therein, can be inflated to project toward the back side of the vehicle.

2. Description of the Related Art

Conventionally, there is known a passenger seat air bag structured such that, within a bag main body inflatable when an inflating gas is supplied therein, there is arranged a tether to restrict the backward projection of a passenger side wall portion to be situated on the back end side of the bag main body in the inflation completion time (see, for example, JP-A-2008-254500). In this passenger seat air bag, the tether is extended backward from the back edge side of a gas supply opening the peripheral edge of which is to be mounted on the storage portion side of the air bag main body and the back end side of the tether is connected to the passenger side wall portion to thereby restrict the separation distance of the passenger side wall portion from the gas supply opening at the inflation completion time of the bag main body and thus restrict the shape of the air bag main body in the inflation completion time.

However, in the conventional passenger seat air bag, although the separation distance of the vicinity of the center of the passenger side wall portion from the gas supply opening in the inflation completion time of the bag main body can be restricted, in the early inflation stage of the bag main body, the lateral two sides of the tether-connected portion of the passenger side wall portion cannot be prevented from projecting greatly toward the back side of the vehicle, which raises room for improvement in restricting the great projection of the bag main body toward the back side of the vehicle in the early inflation stage.

SUMMARY

The invention aims at solving the above problem and thus it is an object of the invention to provide a passenger seat air bag which, while preventing the great projection toward the back side of the vehicle in the early inflation stage, can be developed and inflated quickly.

According to an aspect of the invention, there is provided a passenger seat air bag including: a bag main body to be folded and stored into a storage portion formed in an instrument panel arranged in front of the passenger seat of a vehicle and, when an inflating gas is supplied therein, inflatable so as to project toward the back side of the vehicle; and a tether, arranged within the bag main body, configured to restrict the shape of the bag main body in its inflation completed time, wherein: the bag main body includes a passenger side wall portion to be arranged substantially along the vertical direction on the back end side in the inflation completed time and a peripheral wall portion so shaped as to extend forward from the outer peripheral edge of the passenger side wall portion and converge toward the front end, the peripheral wall portion including on the front lower surface side thereof a gas supply opening so opened up as to enable the inflating gas to flow therethrough and having a peripheral edge mountable onto the storage portion side; the tether extends backward from the back rear edge side of the gas supply opening and has a back end side connected to the vicinity of the center of the passenger side wall portion in the inflation completed time to thereby restrict the distance of the passenger side wall portion from the gas supply opening in the inflation completed time of the bag main body; and a cover sheet formed of a belt-shaped flexible sheet member and capable of being arranged above the gas supply opening, the front end side of the cover sheet being connected to the front edge side of the gas supply opening, and the back end side thereof being connected to the tether.

According to the passenger seat air bag of the invention, the cover sheet having its front end side connected to the front edge side of the gas supply opening and its back end side connected to the tether can be arranged above the gas supply opening, whereby, in the early inflation stage of the air bag, when the inflating gas flows through the gas supply opening into the air bag, the inflating gas flowing toward the back side (toward the passenger side wall portion) strikes at the cover sheet and is thereby so deflected as to go toward the lateral direction. Thus, the inflating gas supplied from the gas supply opening can be prevented from flowing directly toward the passenger side wall portion and the inflating gas deflected toward the lateral direction enables the bag main body to develop widely in the lateral direction.

Therefore, according to the passenger seat air bag of the invention, the two lateral side sections on the central side of the passenger side wall portion with the tether connected thereto can be prevented from projecting greatly backward in the early inflation stage of the air bag. Further, since the cover sheet can be pushed upward by the inflating gas so supplied from the gas supply opening as to flow backward (toward the passenger side wall portion), the middle portion of the cover sheet is pushed upward by the inflating gas to curve the cover sheet, whereby the back end side portion thereof connected to the tether is pulled forward. Thus, the tether can be pulled forward by the cover sheet to thereby prevent the back end of the tether from moving greatly backward in the early inflation stage of the bag main body.

As a result, according to the passenger seat air bag of the invention, in the early inflation stage of the bag main body, the cover sheet can deflect the direction of the inflating gas and can prevent the backward movement of the tether. Thus, in the early inflation stage, while the bag main body is prevented from developing toward the lateral direction, it can be properly prevented from developing in such a manner that it projects the passenger side wall portion greatly backward. When the bag main body inflates and its inflation approaches completion, the flow speed of the inflating gas flowing therein through the gas supply opening is also reduced to thereby remove the pushed-up state of the cover sheet. After the pushed-up state of the cover sheet is removed, while the distance of the passenger side wall portion from the gas supply opening is restricted, the inflation of the bag main body is completed by the tether.

Therefore, the passenger seat air bag of the invention can be developed and inflated quickly, while preventing the great projection thereof toward the vehicle back side in the early inflation stage.

Also, preferably, the passenger seat air bag of the invention may be structured such that the back end side of the cover sheet, at the inflation completion time of the air bag, is connected to an area to be set in a free space projected from the storage portion of the tether. In this case, since the cover sheet is arranged such that, in the early inflation stage of the bag main body, the longitudinal middle portion thereof can be curved at a position projected upward from the storage portion, the inflating gas supplied from the gas supply opening can be deflected stably in such a manner that it branches off laterally in an area projected upward from the storage portion, thereby being able to provide a high flow control effect. Thus, the bag main body can be developed widely in the lateral direction in the early inflation stage.

Especially, the passenger seat air bag of the invention may preferably be structured such that the back end side of the cover sheet, at the inflation completion time of the air bag, is situated near the hinge portion serving as the center of rotation when the door section covering the folded and stored air bag is opened. This structure can prevent the cover sheet from projecting backward greatly in the early inflation stage of the bag main body. Thus, in the early inflation stage of the bag main body, while preventing the backward flow of the inflating gas as much as possible, the inflating gas can be deflected to flow toward the lateral direction, thereby being able to provide a higher flow control effect.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
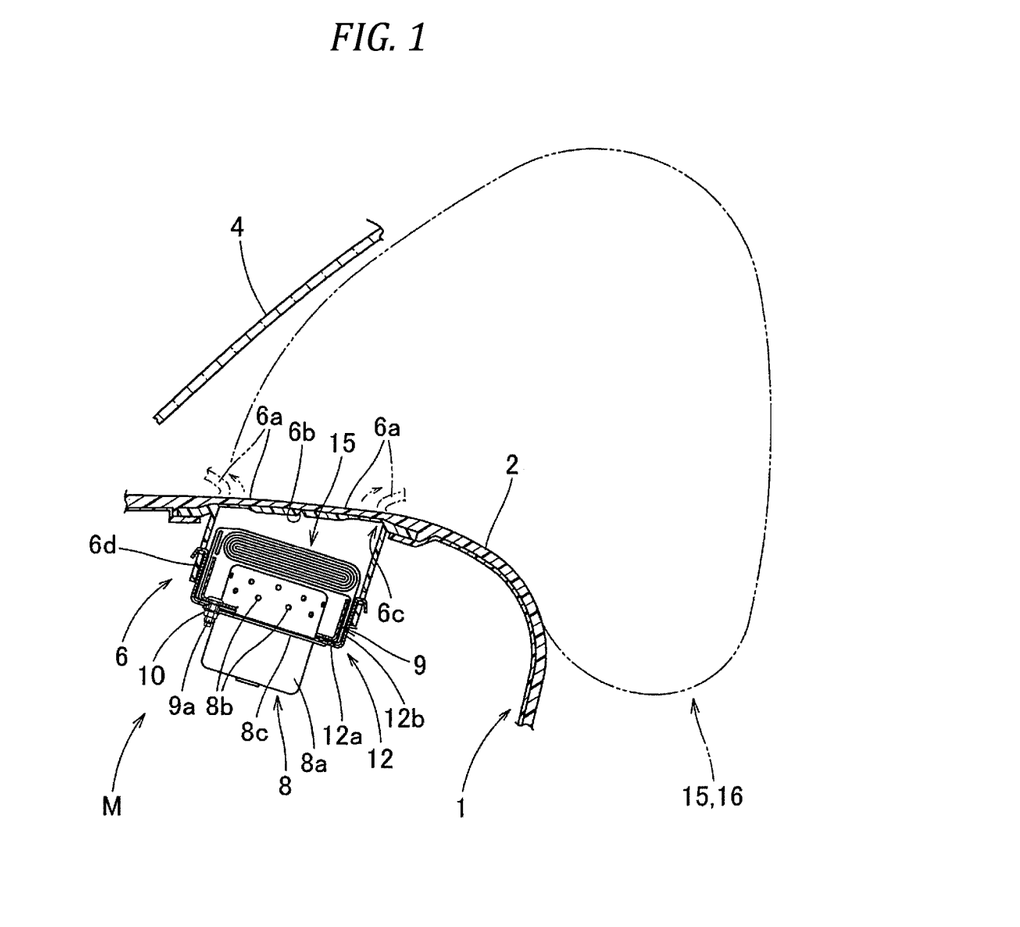
FIG. 1 is a schematic longitudinal section view of a passenger seat air bag apparatus using an air bag according to an embodiment of the invention, showing its mounted state on a vehicle.
Figure 2:
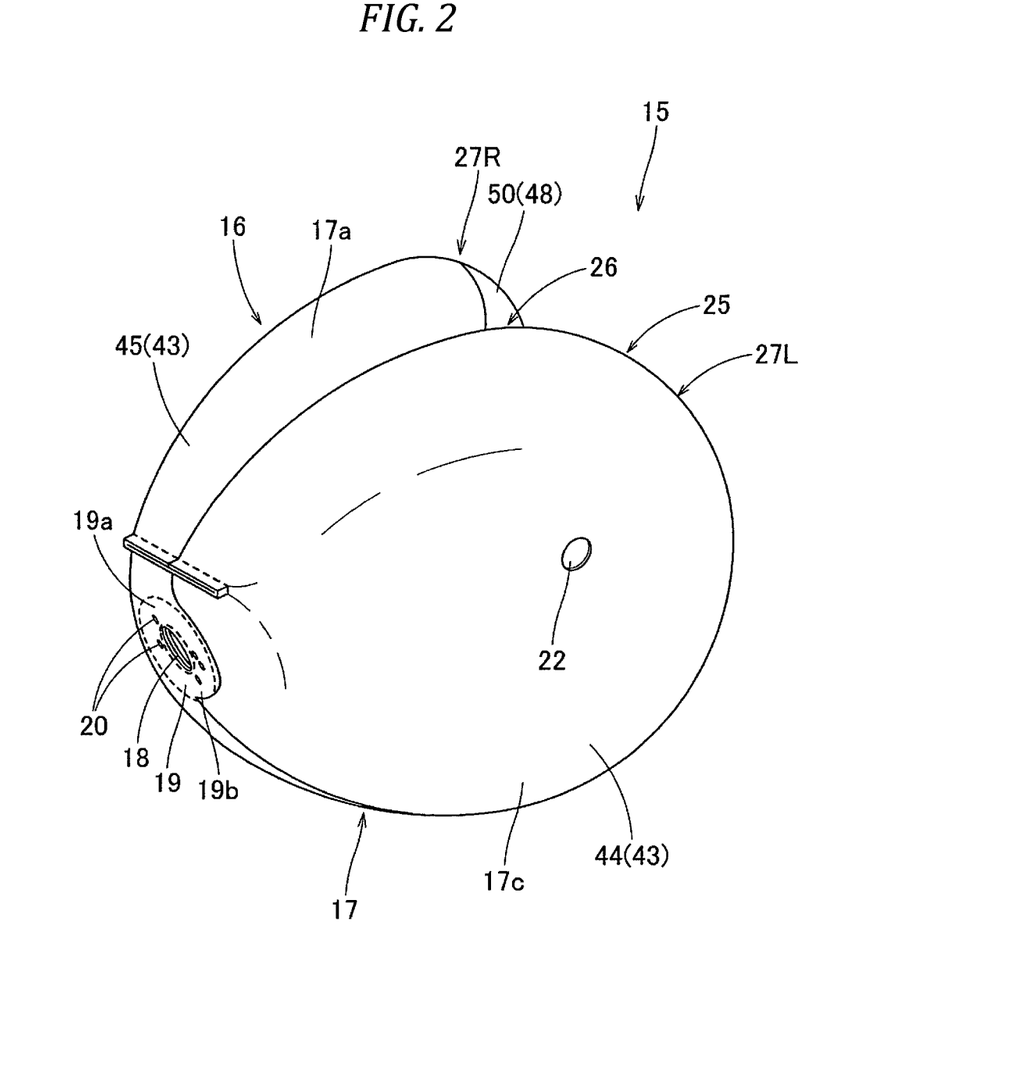
FIG. 2 is a perspective view of the air bag of this embodiment when it is inflated as a single unit.

Description is given below of an embodiment of the invention with reference to the drawings. In this embodiment, description is given of a passenger seat air bag (which is hereinafter called an air bag simply) 15 for use in a passenger air bag apparatus M shown in FIG. 1. The passenger air bag apparatus M is of a top mounting type which, as shown in FIG. 1, in front of a passenger seat of a vehicle, is disposed on the inside of an upper surface 2 of an instrument panel 1. Here, in this embodiment, longitudinal, vertical and lateral directions respectively coincide with the longitudinal, vertical and lateral directions of a vehicle unless specified otherwise.

The passenger seat air bag apparatus M of this embodiment, as shown in FIG. 1, includes a folded air bag 15, an inflator 8 for supplying an inflation gas to the air bag 15, a case 12 serving as a storage portion for storing and holding the air bag 15 and inflator 8, a retainer 9 for mounting the air bag 15 and inflator 8 onto the case 12, and an air bag cover 6 for covering the folded air bag 15 from above.

The air bag cover 6 is formed integrally with the synthetic-resin made instrument panel 1 and includes, on the upper surface side of the instrument panel 1, two door portions 6a and 6a to be pressed open when developing and inflating the air bag 15. The door portions 6a and 6a are arranged side by side on the longitudinal direction side and, in this embodiment, in the periphery thereof, there is arranged a breaking portion 6b having a substantially H-like shape when viewed from above. When developing and inflating the air bag 15, the door portions are pressed by the inflating air bag 15, whereby, while breaking the breaking portion 6b, they are opened longitudinally around a hinge portion 6c arranged on the outside in the longitudinal direction. Also, the air bag cover 6 includes, in the periphery of the door portions 6a and 6a, connecting wall portions 6d to be connected to the case 12.

The inflator 8, as shown in FIG. 1, includes a substantially cylindrical-shaped main body portion 8a having multiple gas discharge ports 8b and a flange portion 8c for mounting the inflator 8 onto the case 12.

The case 12 serving as a storage portion is a substantially rectangular parallelpiped sheet-metal case having a rectangular opening on its upper end side, and it includes a substantially rectangular plate shaped bottom wall portion 12a for inserting the inflator 8 from below and mounting into the case, and a peripheral wall portion 12b extending upward from the outer peripheral edge of the bottom wall portion 12a for locking the connecting wall portions 6d of the air bag cover 6. In this embodiment, using the bolts 9a of the retainer 9 disposed within the air bag 15 as mounting members, the air bag 15 and inflator 8 are penetrated through the peripheral edge portion 19 of the gas supply opening 18 of the air bag 15, the bottom wall portion 12a and the flange portion 8c of the inflator 8 and are fixed by a nut 10, thereby mounting them onto the bottom wall portion 12a of the case 12. Also, on the bottom wall portion 12a of the case 12, there is provided a bracket (not shown) to be connected to the body side of the vehicle.

The air bag 15, as shown in FIGS. 2 to 6, includes a bag main body 16 inflatable by supplying inflation gas therein, tethers 29, 36 and 37 arranged within the bag main body 16 for restricting the inflation completion shape of the bag main body 16, and a cover sheet 40 to be arranged within the bag main body 16.

Figure 12:
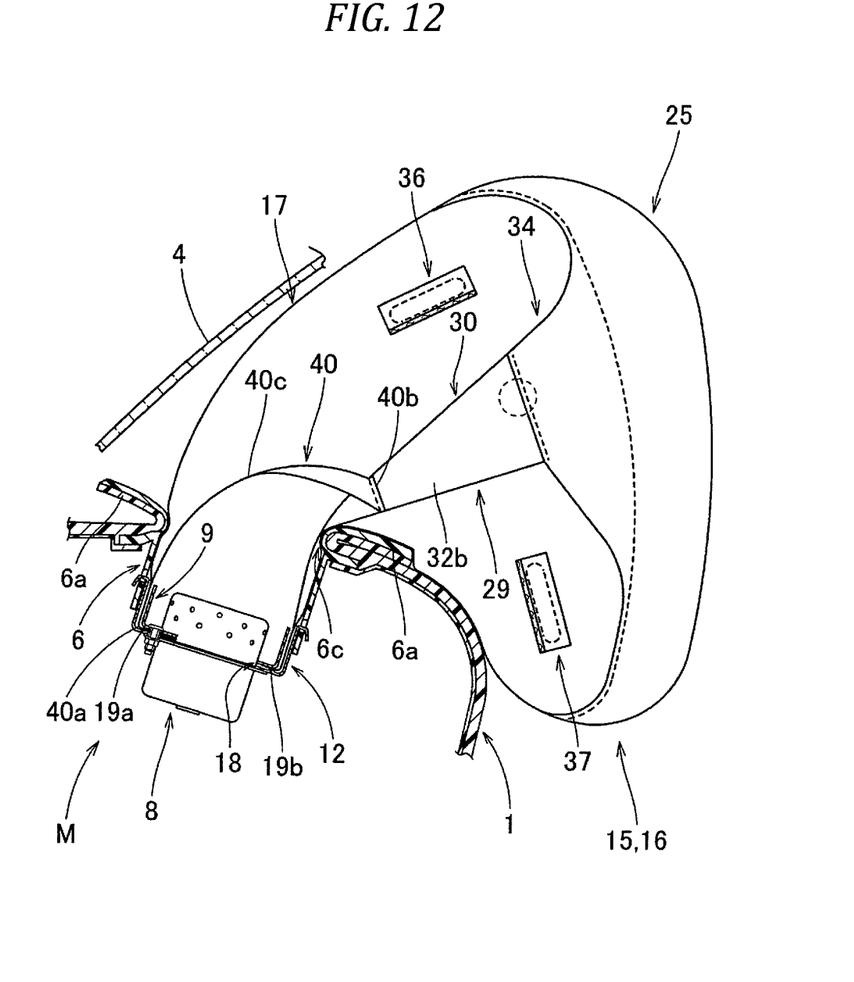
FIG. 12 is a schematic longitudinal section view of a passenger seat air bag apparatus using the air bag of this embodiment, taken along its longitudinal direction to show the inflation completed state of the air bag.

The air bag main body 16, in this embodiment, as shown by the two-dot chain line of FIG. 1 and in FIG. 12, is structured as a substantially bag-shaped member which, when inflation is completed, can be arranged so as to close the space between the upper surface 2 of the instrument panel 1 and a windshield 4 existing above the instrument panel 1. Specifically, the air bag main body 16 includes a passenger side wall portion 25 arranged to extend substantially along the vertical direction on the back end side when inflation is completed, and a peripheral wall portion 17 having a shape extending forward from the outer peripheral edge of the passenger side wall portion 25 and converging toward the front end side, while the main body, when inflation is completed, provides a substantially quadrangular pyramid shape with the front end side of the peripheral wall portion 17 as its top portion.

The peripheral wall portion 17 is a portion which is disposed such that, when the inflation of the air bag 15 is completed, it mainly closes the space between the upper surface 2 of the instrument panel 1 and the windshield 4 existing above the instrument panel 1. It includes an upper wall section 17a and a lower wall section 17b arranged on the upper and lower sides substantially along the lateral direction, and a left wall section 17c and a right wall section 17d arranged on the left and right sides substantially along the longitudinal direction. In the vicinity of the front end of the lower wall section 17b of the peripheral wall portion 17 that provides the vicinity of the front end of the bag main body 16 in the inflation completion time, there is formed a gas supply opening 18 through which the inflating gas can be supplied into the air bag main body, while the opening has a substantially circular shape capable of inserting therein the main portion 8a of the inflator 8. This gas supply opening 18 is formed in the substantially laterally central position of the lower wall section 17b. In the peripheral edge portion 19 of the gas supply opening 18 of the lower wall section 17b, there are formed multiple (in this embodiment, four) mounting holes 20 through which the bolts 9a of the retainer 9 can be inserted for mounting the peripheral edge portion 19 of the gas supply opening 18 onto the bottom wall portion 12a of the case 12. Also, in the left and right wall sections 17c and 17d of the peripheral wall portion 17, there are formed vent holes 22 respectively for discharging extra inflating gas supplied into the bag main body 16, each hole opened substantially in a circular shape.

Figure 3:
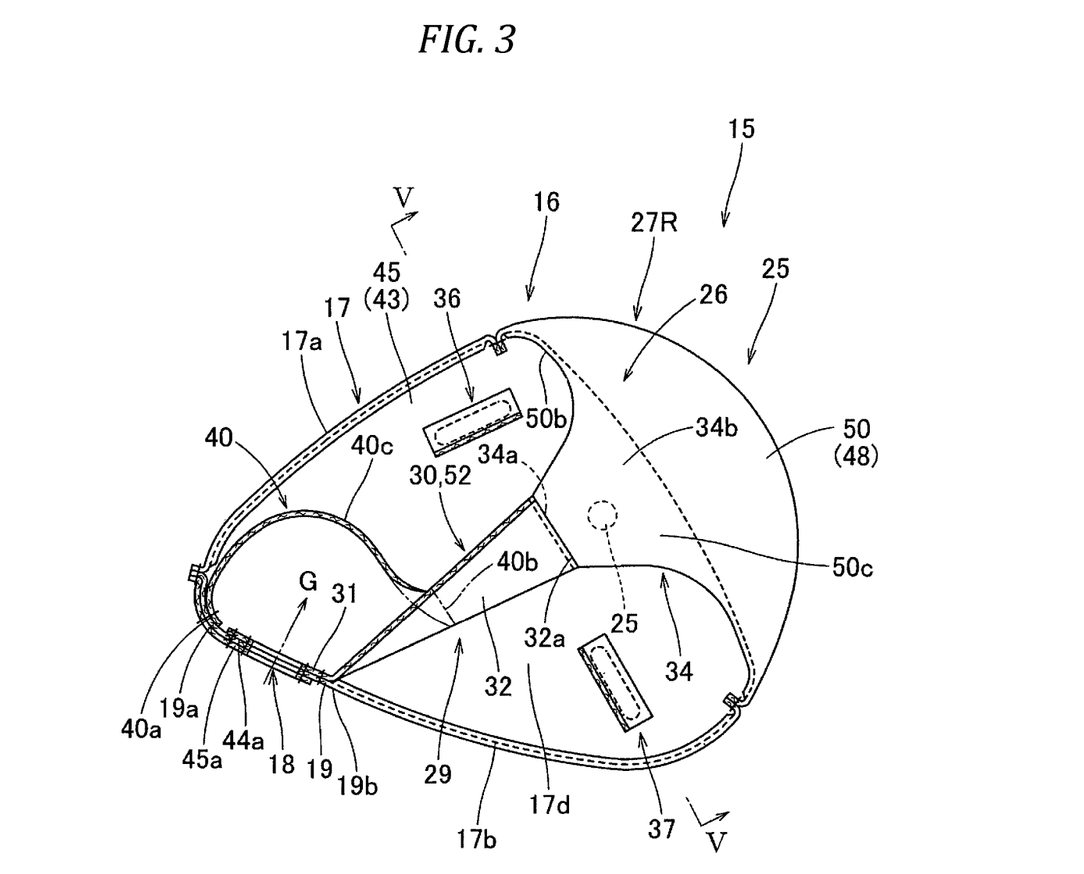
FIG. 3 is a schematic longitudinal section view of the air bag of FIG. 2, taken along its longitudinal direction.
Figure 4:
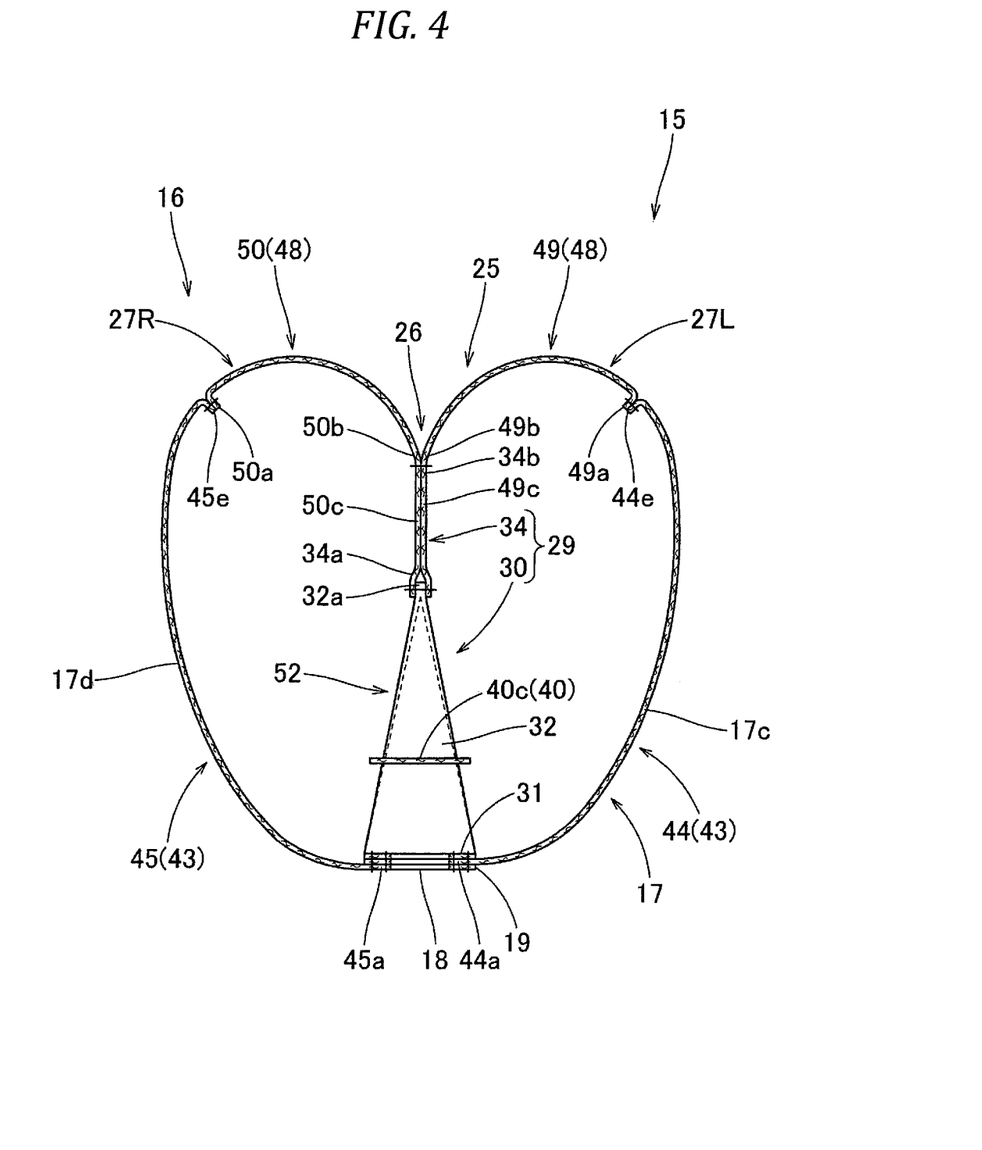
FIG. 4 is a schematic transverse section view of the air bag of FIG. 2, taken along its transverse direction.

The passenger side wall portion 25 is arranged such that, in the inflation completion time of the bag main body 16, it faces a passenger seated on the passenger seat and extends substantially along the vertical direction on the back end side of the bag main body 16 providing the passenger side. In this embodiment, the passenger side wall portion 25 includes a forwardly recessing recess section 26 extending substantially along the vertical direction at a position which, when the inflation of the air bag main body 16 is completed, provides substantially a center position in the lateral direction (see FIGS. 3 and 4). This recess section 26, in this embodiment, is arranged to extend substantially over the whole vertical areas of the passenger side wall portion 25. The recess section 26 of the passenger side wall portion 25 includes, on the left and right side thereof, projecting sections 27L and 27R which project relatively backwardly. That is, in the passenger side wall portion 25 of the bag main body 16 of the embodiment, the recess section 26 to be recessed in the center in the lateral direction and the projecting sections 27L, 27R to be arranged on the left and right sides of the recess section 26 in the inflation completion time of the air bag main body 16 are arranged successively along the vertical direction (FIGS. 3 and 4). Specifically, in this embodiment, the projected state of the projecting section 27L, 27R and the recessed state of the recess section 26 are set substantially identical with each other, while such recessed and projected shapes are allowed to converge forwardly within the areas of the upper and lower wall sections 17a and 17b of the peripheral wall portion 17. In the bag main body 16 of this embodiment, the leading end of the recessed shape of the recess section 26 is constituted of a sewn portion formed by sewing (connecting) together the inner peripheral edges 49b and 50b of an inner left panel 49 and an inner right panel 50 (which are described later) constituting the passenger side wall portion 25, while the projection top portions of the projecting sections 27L and 27R are constituted of sewn portions formed by sewing together the rear edges 44e and 45e of an outer left panel 44 and an outer right panel 45 and the outer edges 49a and 50a of the inner left and right panels 49 and 50 (all of the panels are described later).

Figure 5:
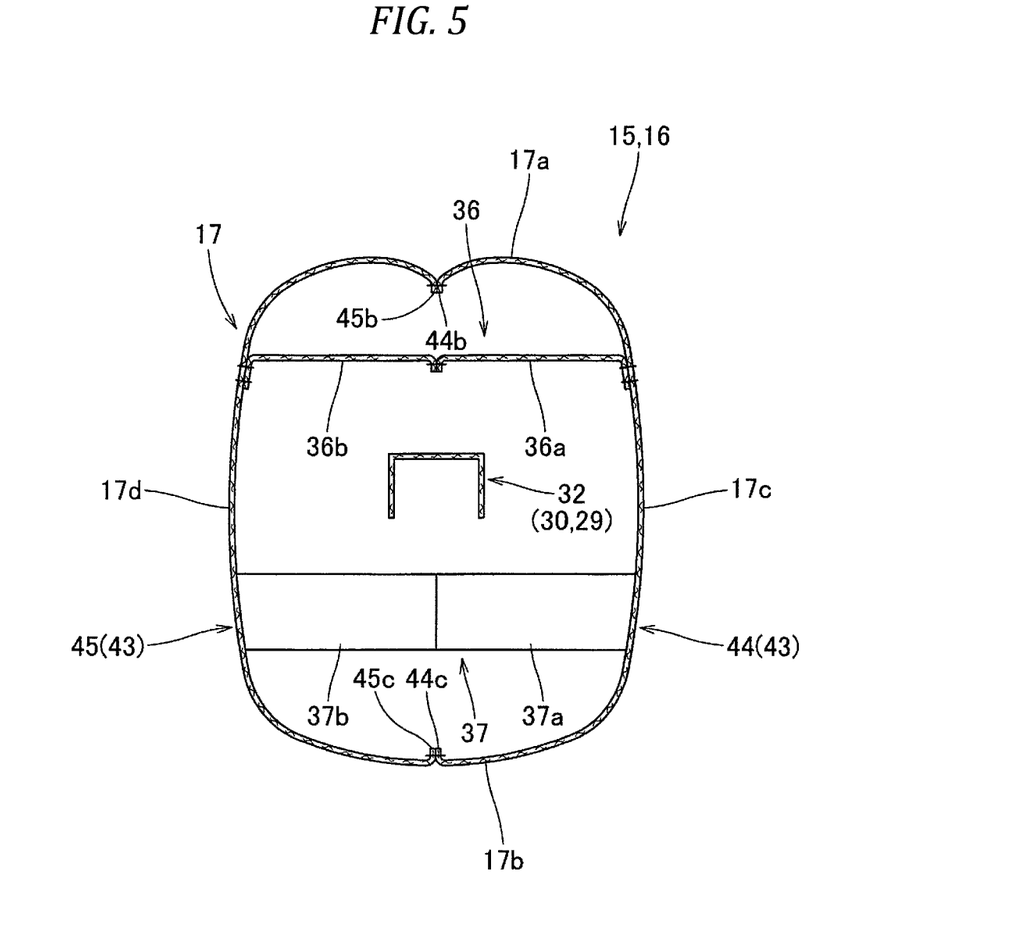
FIG. 5 is a schematic section view taken along the V-V portion of FIG. 3.
Figure 6:
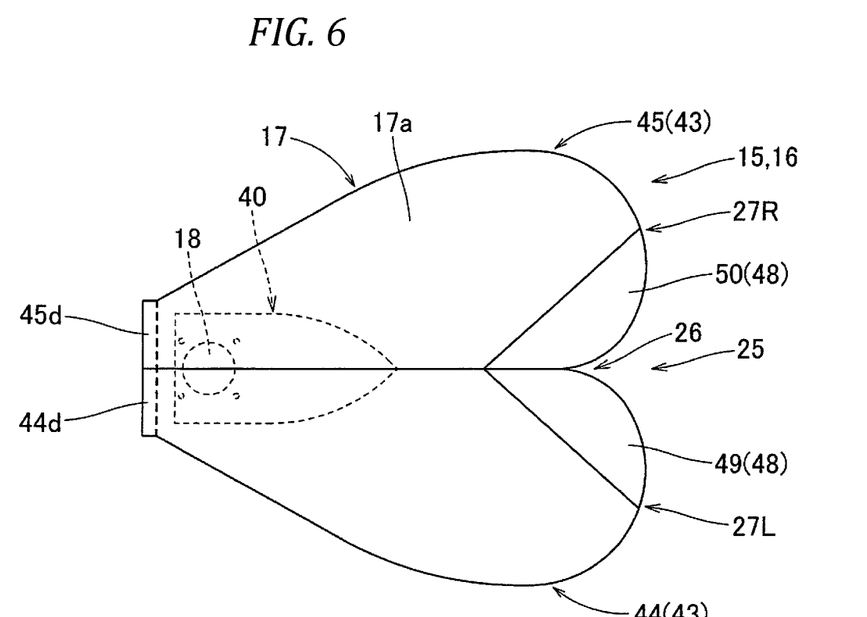
FIG. 6 is a plan view of the air bag of FIG. 2.

Within the bag main body 16, in this embodiment, as shown in FIGS. 3 to 5, there are arranged three tethers 29, 36 and 37. Specifically: the longitudinal tether 29 for connecting the vicinity of the gas supply opening 18 to the passenger side wall portion 25; and, the two left and right tethers 36 and 37 for connecting together the left and right wall sections 17c and 17d respectively above and below the longitudinal tether 29.

The longitudinal tether 29, in this embodiment, is structured such that a front side portion 30 extending from the peripheral edge of the gas supply opening 18 and a back side portion 34 extending from the passenger side wall portion 25 side are connected to each other.

Figure 7:
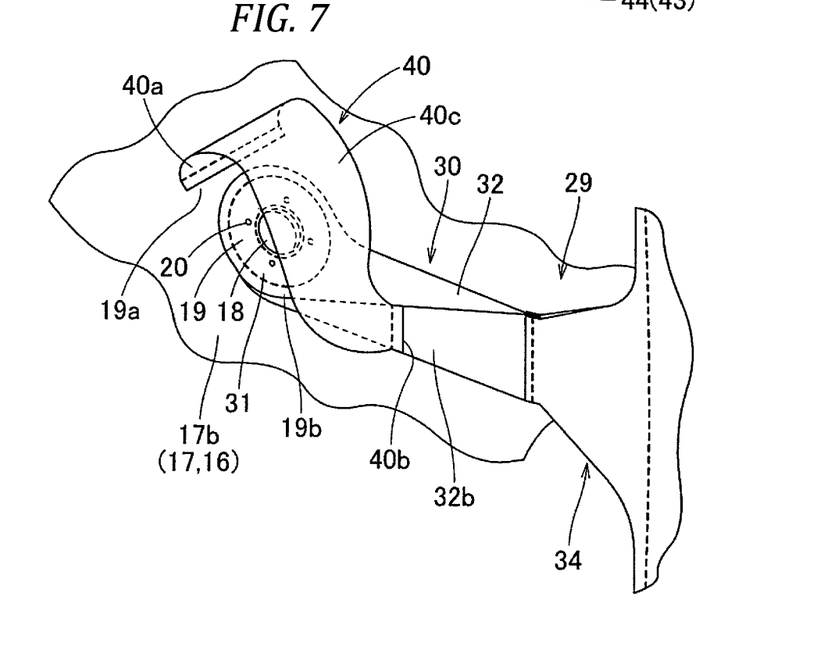
FIG. 7 is a partially enlarged schematic perspective view of a longitudinal tether and a cover sheet disposed within the air bag of this embodiment.
Figure 8:
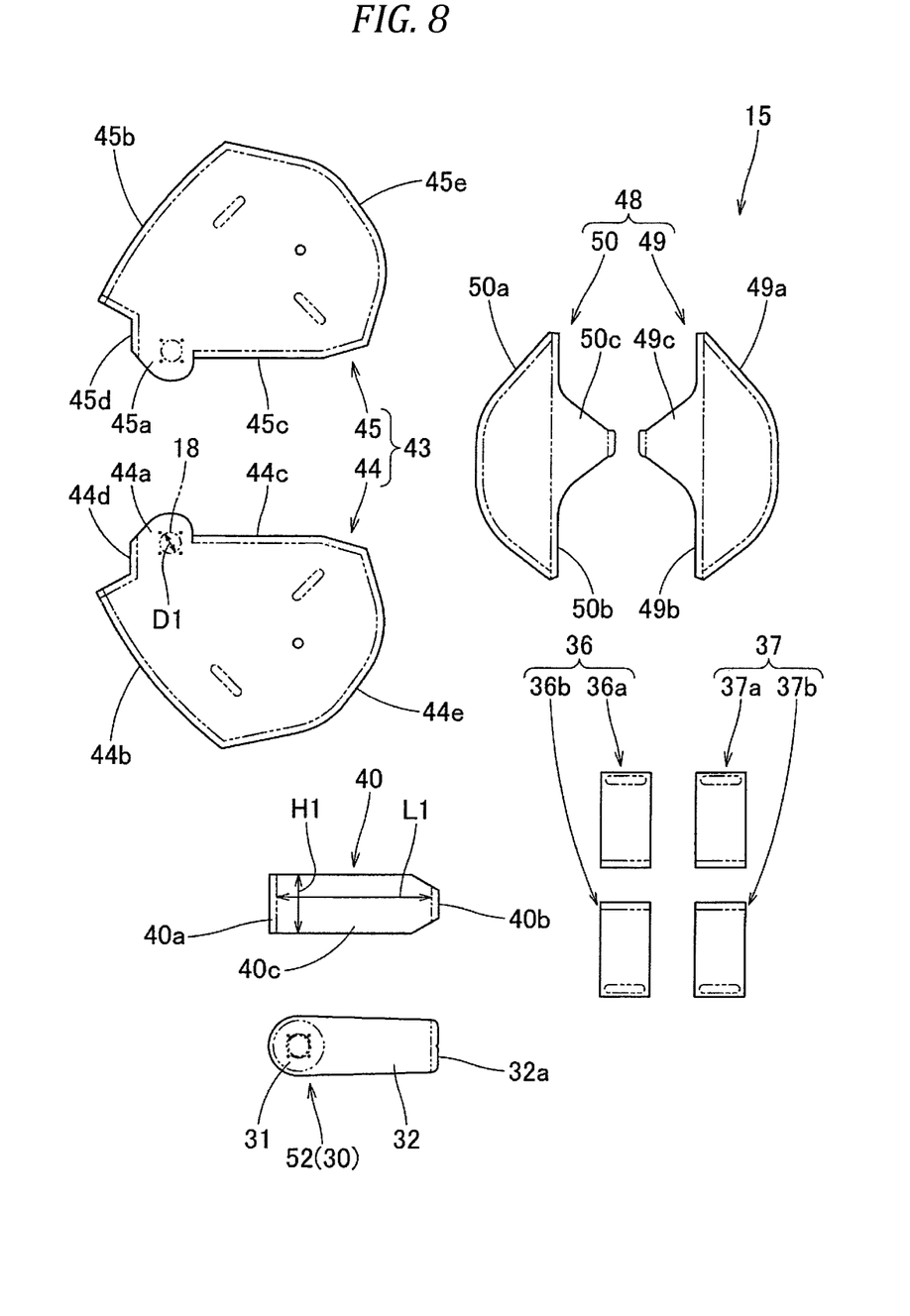
FIG. 8 is a plan view of a fabric for forming the air bag of this embodiment.

The front side portion 30, in this embodiment, is formed by folding a front side portion element member 52 shown in FIG. 8 into a shape which is symmetric with the center of the gas supply opening 18 as the center, while the outer shape thereof in the inflation completion time of the bag main body 16 provides a solid shape similar to a substantially triangular pyramid with its front end side extending substantially horizontally and its rear end side extending vertically (see FIGS. 3 to 5). In this embodiment, as shown in FIGS. 3 and 4, the front end side area of the front side portion 30 is used as a connecting section 31 for connection to the bag main body 16, in this connecting section 31, there are formed openings (not shown) corresponding to the gas supply opening 18 and mounting holes 20, and the whole periphery of the connecting section 31 is sewn to the lower wall section 17b in the peripheral edge 19 of the gas supply opening 18. And, such area of the front side portion 30 as extends backward from the rear edge section 19b of the peripheral edge 19 of the gas supply opening 18 constitutes a main body 32, while the outer shape of this main body 32 provides a solid shape similar to a substantially triangular pyramid (see FIG. 7). The vertical width dimension of the back end 32a of the main body 32 to be sewn to the front end 34a of the back side portion 34 is substantially coincident with the vertical width dimension of the front end 34a of the back side portion 34.

The back side portion 34 has a sheet-like shape and, in this embodiment, includes extension sections 49c and 50c which extend from the inner peripheral edges 49b and 50b of the inner left panel 49 and inner right panel 50 constituting the passenger side wall portion 25 of the bag main body 16 and are united with the inner left and right panels 49 and 50 (see FIGS. 3 and 4). These extension sections 49c and 50c extend from the near-to-center areas of the inner peripheral edges 49b and 50b of the inner left and right panels 49 and 50. In other words, the back side portion 34 is formed of two layered sheets and the sheets are respectively united with the inner left and right panels 49 and 50, whereby the rear end 34b side is connected to the vertically and laterally substantial central area (the leading end of the recessed shape of the recess section 26) of the passenger side wall portion 25. Specifically, in this embodiment, the back side portion 34 has a substantially trapezoidal shape in which the front end 34a side to be connected to the front side portion 30 has a narrow width and the back end 34b side area is spread vertically toward the inner peripheral edges 49b and 50b of the inner left and right panels 49 and 50.

The left and right tethers 36 and 37 are arranged substantially along the lateral direction so that, in the inflation completion time of the bag main body 16, they can connect the left and right wall sections 17c and 17d to each other. In this embodiment, as shown in FIGS. 3 and 5, they are arranged in two portions respectively existing above and below the longitudinal tether 29. In this embodiment, the upper lateral tether 36 arranged above the longitudinal tether 29 and the lower lateral tether 37 arranged below the longitudinal tether 29 are respectively formed to have a belt-like shape extending substantially along the lateral direction and are arranged such that, in the inflation completion time of the bag main body 16, they extend substantially along the horizontal direction (see FIGS. 3 and 5). Also, in this embodiment, the upper and lower lateral tethers 36 and 37 are both formed, as shown in FIG. 5, by connecting together the edges of two tether-forming fabrics 36a, 36b and 37a, 37b arranged side by side in the lateral direction.

The cover sheet 40 is formed of a belt-shaped flexible sheet member and, within the bag main body 16, as shown in FIGS. 3 and 7, it is arranged above the gas supply opening 18, while its front end 40a side is connected to the front edge 19a side of the peripheral edge 19 of the gas supply opening 18 and its back end 40b side is connected to the longitudinal tether 29. The cover sheet 40 has such a length dimension as does not interfere with the restriction of the inflation completion time shape of the bag main body 16 by the longitudinal tether 29 and is structured such that, when the air bag 15 is developed and inflated, the right and left sides thereof can be opened to thereby cover substantially the whole space above the gas supply opening 18 (see FIGS. 3, 6 and 7). Specifically, the width dimension H1 of the cover sheet 40 is set larger than the inside diameter dimension D1 of the gas supply opening 18 (see FIG. 8) and substantially equal to the width dimension of the connecting section 31 of the front side portion 30 of the longitudinal tether 29, thereby enabling the cover sheet 40 to cover substantially the whole space above the gas supply opening 18. And, with the front edge of the cover sheet 40 extending substantially along the lateral direction, substantially the whole of the front end 40a side thereof is sewn to the front edge 19a side of the peripheral edge 19 of the gas supply opening 18 using sewing threads (see FIG. 7). Also, while the cover sheet 40 is twisted in the longitudinal middle portion, substantially the whole of the back end 40b side thereof arranged to extend substantially along the vertical direction is sewn to the main body 32 of the front side portion 30 of the longitudinal tether 29 using sewing threads (see FIG. 7). Specifically, in this embodiment, the cover sheet 40 is structured such that its back end 40b side in the inflation completion time of the bag main body 16 is situated at a position which exists near the hinge portion 6c of the air bag cover 6 serving as the rotation center of the door portion 6a arranged on the back side and slightly backward just above the hinge portion 6c (see FIG. 12). That is, the back end 40b side of the cover sheet 40 is sewn to a position which exists substantially near the longitudinal center of the left side section 32b of the main body 32 of the front side portion 30 of the longitudinal tether 29.

Also, as shown in FIG. 8, the width dimension of the back end 40b side of the cover sheet 40 is set smaller than the width dimension of the front end 40a side. The cover sheet 40, up to its area for covering the space above the gas supply opening 18 in the early stage of inflation of the bag main body 16, is formed substantially constant in the width dimension, whereas its area existing backwardly of the gas supply opening 18 reduces in width toward the back end 40b side. The length dimension L1 (see FIG. 8) of the cover sheet 40 is set such that, in the inflation completion time of the bag main body 16, the cover sheet 40 is arranged loosely to cause no tension between the front and back ends 40a and 40b (see FIG. 12) and thus does not interfere with the restriction of the inflation completion time shape of the bag main body 16 by the longitudinal tether 29.

The bag main body 16 is produced by connecting together the peripheral edges of a fabric having a specific shape into a bag shape. In this embodiment, as shown in FIG. 8, it includes a peripheral wall panel portion 43 mainly constituting the peripheral wall portion 17 side and a passenger side panel portion 48 mainly constituting the passenger side wall portion 25 side. The peripheral wall portion 43 includes two outer left and right panels 44 and 45, while the passenger side wall portion 25 includes a pair of inner left and right panels 49 and 50.

The outer left and right panels 44 and 45 constituting the peripheral wall portion 43 are so structured as to divide the peripheral wall portion 17 to right and left sections and, as shown in FIG. 8, they respectively have a substantially fan-like shape. The outer left panel 44 includes a projecting portion 44a constituting the peripheral edge of the gas supply opening 18. The outer left panel 44 constitutes the left wall section 17c, the approximate left front half area of the upper wall section 17a, the approximate left half area of the lower wall section 17b and such area of the passenger side wall portion 25 as exists leftward of the projection top area of the projecting section 27L. The outer right panel 45 includes a projecting portion 45a constituting the peripheral edge of the gas supply opening 18. The outer right panel 45 constitutes the right wall section 17d, the approximate right front half of the upper wall section 17a, the approximate right half of the lower wall section 17b and such area of the passenger side wall portion 25 as exists rightward of the projection top area of the projecting section 27R. The upper edges 44b, 45b and lower edges 44c, 45c of the outer left and right panels 44 and 45 are sewn to each other to thereby constitute the peripheral wall portion 17 having a substantially cylindrical shape (see FIG. 5).

The inner left and right panels 49 and 50 constitute an area between the projecting sections 27L and 27R in the passenger side wall portion 25. Specifically, the inner left and right panels 49 and 50 constitute an area ranging from the area of the back end side of the upper wall section 17a of the peripheral wall portion 17 to an area existing between the projection top areas of the projection sections 27L and 27R of the passenger side wall portion 25. They are respectively approximately half-moon shaped and paired with each other in such a manner that the above area is divided to left and right sections at the position of the leading end of the recess section 26 to thereby constitute an area ranging from the front end of the recess section 26 to the projection top position of the left side projection section 27L and an area ranging from the front end of the recess section 26 to the projection top position of the right side projection section 27R (see FIG. 8). In this embodiment, on the side of the inner peripheral edges 49b and 50b of the inner left and right panels 49 and 50, as shown in FIG. 8, there are formed extension sections 49c and 50c constituting the back side section 34 of the longitudinal tether 29 respectively. Also, the inner left and right panels 49 and 50 are structured such that, while they are developed flat, the outer peripheral edges 49a and 50a extend substantially along the curved shapes of the back edges 44e and 45e of the outer left and right panels 44 and 45.

In this embodiment, the peripheral wall panel portion 43 and passenger side panel portion 48 respectively constituting the bag main body 16, the front side portion forming element member constituting the longitudinal tether 29, and the tether forming fabrics 36a, 36b, 37a and 37b respectively constituting the upper lateral tether 36 and lower lateral tether 37 are respectively formed of flexible woven fabrics made of polyester yarns, polyamide yarns or the like.

Next, description is given of manufacture of the air bag 15 of this embodiment. Previously, the inner left and right panels 49 and 50 are put on each other in such a manner that their peripheral edges are matched to each other while they are developed flat, and further the inner peripheral edges 49b and 50b are sewn to each other using sewing threads. Also, one-end sides of the tether forming fabrics 36a, 36b, 37a and 37b are previously sewn to the outer left and right panels 44 and 45. Firstly, the outer left and right panels 44 and 45 are put on each other with their peripheral edges matched to each other while they are developed flat, and the lower edges 44c and 45c are sewn to each other using sewing threads. And, the outer left and right panels 44 and 45 are opened in such a manner that the projection sections 44a and 45a are overlapped with each other. Then, the front side portion forming element member 52 of the longitudinal tether 29 is put on the projection sections 44a and 45a and is sewn to them in the peripheral edge 19 of the gas supply opening 18 using sewing threads; and, thereafter, the gas supply opening 18 and mounting holes 20 are formed by drilling. Next, the front end 40a side of the cover sheet 40 is sewn to the front edge 19a side of the peripheral edge 19 of the gas supply opening 18 using sewing threads. Thereafter, the outer left and right panels 44 and 45 are put on each other with their peripheral edges matched to each other and the upper edges 44b and 45b are sewn to each other using sewing threads. Next, the outer left and right panels 44 and 45 are opened such that their back edges 44e and 45e are separated from each other, the inner left and right panels 49 and 50, which are spread such that their outer edges 49a and 50a are separated from each other, are put on each other, the back edge 44e of the outer left panel 44 and the outer peripheral edge 49a of the inner left panel 49 are sewn to each other using sewing threads, and the back edge 45e of the outer right panel 45 and the outer peripheral edge 50a of the inner right panel 50 are similarly sewn to each other. Then, the main body 32 of the front side portion 30 of the longitudinal tether 29 is two-folded, the folded back end 32a side is sewn to the front end 34a side of the back side portion 34 (the front end sides of the extension sections 49c and 50c of the inner left and right panels 49 and 50), thereby forming the longitudinal tether 29. Also, the corresponding other ends of the tether forming fabrics 36a, 36b, 37a and 37b are connected to each other, thereby forming the upper and lower lateral tethers 36 and 37. Thereafter, using the openings of the front edges 44d and 45d which are the un-sewn portions of the outer left and right panels 44 and 45, the bag main body 16 is reversed in such a manner that the margin of the edge thereof is not exposed to the outside. Next, the front edges 44d and 45d of the outer left and right panels 44 and 45 are put on each other while they are two-folded, and they are then sewn to each other using sewing threads. Next, the back end 40b of the cover sheet 40 is pulled out from the gas supply opening 18 and is sewn to the main body 32 of the front side portion 30 of the longitudinal tether 29 pulled out from the gas supply opening 18 using sewing threads, thereby manufacturing the air bag 15.

And, the thus manufactured air bag 15 with the retainer 9 stored therein is folded in such a manner that it can be stored into the case 12, and the periphery of the folded air bag 15 is wrapped by a breakable wrapping sheet (not shown) in a folding unbreakable manner. Next, the folded air bag 15 is placed on the bottom wall portion 12a of the case 12. The main body portion 8a of the inflator 8 is inserted into the case 12 from below the bottom wall portion 12a and the bolts 9a projecting downward from the bottom wall portion 12a are inserted into the flange portion 8c of the inflator 8. Thereafter, when the nut 10 is fastened to the bolts 9a projecting from the flange portion 8c of the inflator 8, the folded air bag 15 and inflator 8 can be mounted onto the case 12.

And, when the peripheral wall portion 12b of the case 12 is locked to the connecting wall portion 6d of the air bag cover 6 of the instrument panel 1 mounted on the vehicle and a bracket (not shown) of the case 12 is fixed to the body side of the vehicle, the passenger seat air bag M can be mounted onto the vehicle.

After the passenger seat air bag M is mounted onto the vehicle, in the front collision of the vehicle, when the inflating gas is discharged from the gas discharge ports 8b of the inflator 8, the air bag 15 is inflated due to supply of the inflating gas therein, thereby pushing open the door portions 6a, 6a of the air bag cover 6. And, the air bag 15 is projected upward from the case 12 through an opening formed by pushing open the door portions 6a, 6a of the air bag cover 6 and is developed and inflated while being projected toward the back side of the vehicle, thereby completing its inflation as shown by the two-dot chain line of FIG. 1 and in FIG. 12.

Figure 9:
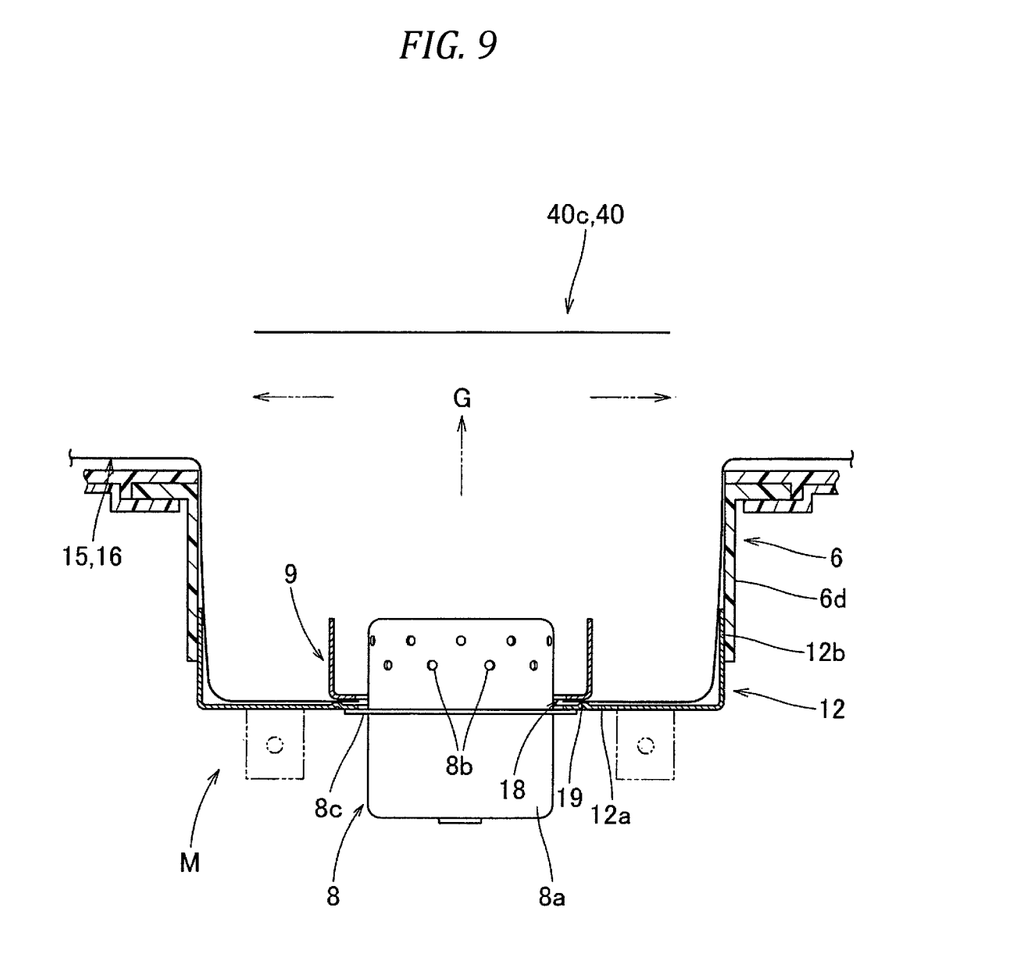
FIG. 9 is a schematic longitudinal section view of a passenger seat air bag apparatus using the air bag of this embodiment, taken along its lateral direction to show the state of the air bag in the early inflation stage.

In the air bag 15 of the passenger seat air bag apparatus of this embodiment, since the cover sheet 40 for connecting the front end 40a side to the front edge 19a side of the gas supply opening 18 and connecting the rear end 40b side to the longitudinal tether 19 is structured such that it can be arranged above the gas supply opening 18, when, in the early stage of inflation of the air bag 15, the inflating gas G is supplied into the air bag through the gas supply opening 18, the inflating gas G flowing backward (toward the passenger side wall portion 25), as shown in FIG. 9, strikes at the cover sheet 40 and thus the flowing direction thereof is deflected toward the lateral direction. This can prevent the inflating gas G supplied from the gas supply opening 18 from flowing directly toward the passenger side wall portion 25 and also enables the inflating gas G deflected toward the lateral direction to develop the bag main body 16 widely in the lateral direction.

Figure 10:
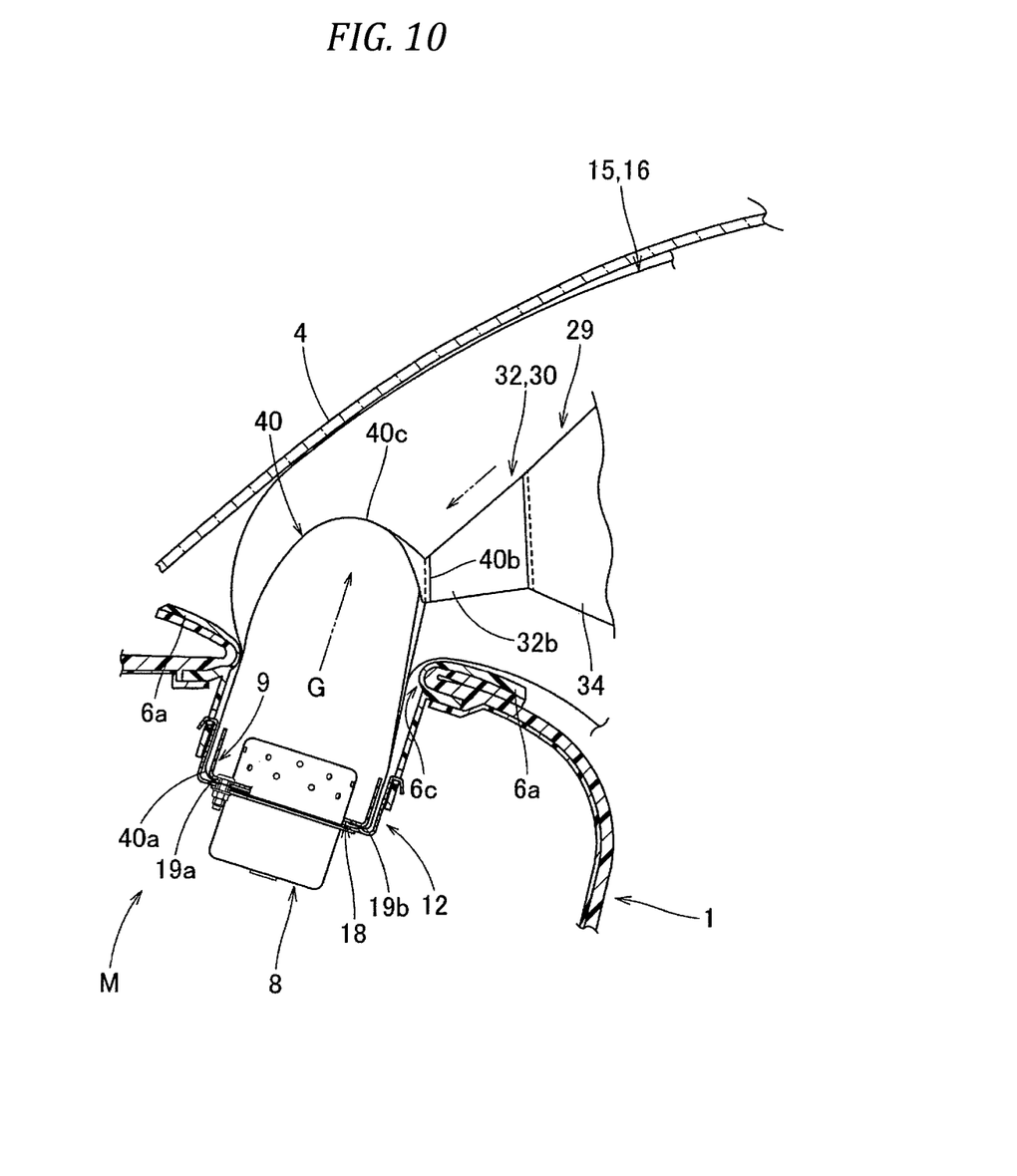
FIG. 10 is a schematic longitudinal section view of a passenger seat air bag apparatus using the air bag of this embodiment, taken along its longitudinal direction to show the state of the air bag in the early inflation stage.
Figure 11:
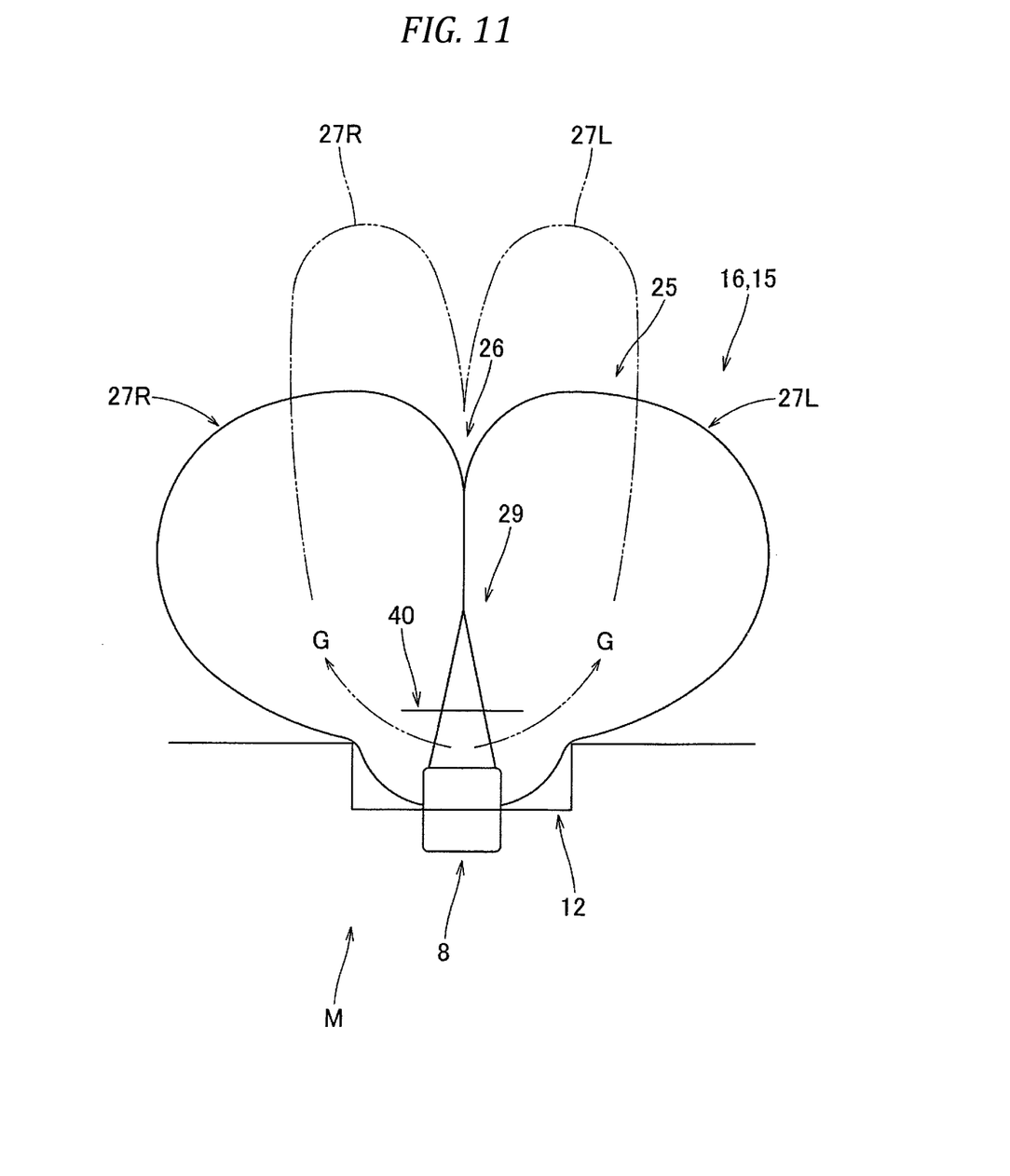
FIG. 11 is a typical view of a passenger seat air bag apparatus using the air bag of this embodiment, showing the state of the air bag in the early inflation stage.

Therefore, according to the air bag 15, in the passenger side wall portion 25, the left and right side sections (projecting sections 27L and 27R) of the central side recess section 26 with the longitudinal tether 29 connected thereto can be prevented from projecting backward greatly in the early stage of inflation of the air bag 15. Especially, according to the air bag 15 of this embodiment, since the passenger side wall portion 25 is structured such that the recess section 26 is arranged on the central side in the lateral direction and the projecting sections 27L and 27R projecting relatively backward are arranged on the lateral-direction two sides of the recess section 26, unless the cover sheet 40 is included, in the early state of inflation of the air bag, the areas of the projecting sections 27L and 27R project backward greatly as shown by the two-dot chain line of FIG. 11. However, according to the air bag 15, since the inflating gas G supplied from the gas supply opening 18 is deflected toward the lateral direction by the cover sheet 40, the areas of the projecting sections 27L and 27R, as shown in FIG. 11, can be prevented from projecting backward greatly but can be inflated such that they are developed widely in the lateral direction. Further, since the cover sheet 40 can be pushed upward by the inflating gas G flowing backward (toward the passenger side wall portion 25) from the gas supply opening 18, as shown in FIG. 10, the lateral-direction middle section 40*c* is pushed upward by the inflating gas G to curve the cover sheet 40, whereby the back end 40*b* side connected to the longitudinal tether 29 is pulled forward. Therefore, the longitudinal tether 29 can be pulled forward by the cover sheet 40 and thus, in the early inflation stage of the bag main body 16, the back end of the longitudinal tether 29 can be prevented from moving backward greatly.

As a result, according to the air bag 15, since, in the early inflation stage of the bag main body 16, the direction of the inflating gas G can be deflected and the backward movement of the rear end of the longitudinal tether 29 can be prevented by the cover sheet 40, the bag main body 16, in the early stage of inflation, can be properly prevented from developing toward the lateral direction and also the passenger side wall portion 25 can be properly prevented from projecting backward greatly. And, when the bag main body 16 inflates and its inflation approaches completion, the flow speed of the inflating gas G flowing therein through the gas supply opening 18 is also reduced, thereby removing the pushed-up state of the cover sheet 40. According to the air bag 15, since the length dimension of the cover sheet 40, as shown in FIG. 12, is set such that it does not interfere with the restriction of the shape of the bag main body 16 in the inflation completed time is completed by the longitudinal tether 29, after the pushed-up state of the cover sheet 40 is removed, the inflation of the bag main body 16 is completed while its distance from the gas supply opening 18 of the passenger side wall portion 25 is restricted by the longitudinal tether 29.

Therefore, the air bag 15, while preventing the great projection toward the back side of the vehicle in the early inflation stage, can be developed and inflated quickly.

Also, according to the air bag 15, within the bag main body 16, above and below the longitudinal tether 29, as shown in FIGS. 3 and 5, the upper side lateral tether 36 and lower side lateral tether 37 for connecting together the left wall section 17*c* and right wall section 17*d* opposed to each other on the lateral direction side of the peripheral wall portion 17 are arranged along the lateral direction. Thus, when the bag main body 16 is developed widely in the lateral direction by supplying therein the inflating gas G deflected toward the lateral direction by the cover sheet 40, the bag main body 16 can be prevented from spreading greatly in the lateral direction and thus the left and right wall sections 17*c* and 17*d* can be prevented from separating from each other excessively greatly. Thus, the bag main body 16 can be prevented against development and inflation with a rebound phenomenon constituted of repeated occurrence of backward projection and lateral spreading, thereby enabling it to inflate with its oscillation restricted. Especially, according to the air bag 15, since the upper side lateral tether 36 and lower side lateral tether 37 are arranged above and below the longitudinal tether 29 across the longitudinal tether 29, the distance between the left and right wall sections 17*c* and 17*d* can be accurately restricted over a wide vertical range.

Further, according to the air bag 15, since the back end 40*b* side of the cover sheet 40, when the inflation of the air bag 15 is completed, is connected to such a free space of the longitudinal tether 29 as projects from the case 12 serving as the storage portion, the cover sheet 40, as shown in FIG. 10, in the early inflation stage of the bag main body 16, is arranged such that the longitudinal middle section 40*c* is curved at a position projected upward from the case 12, whereby the inflating gas G supplied from the gas supply opening 18 can be stably deflected to branch laterally in an area (middle section 40*c*) projected upward from the case 12 to thereby provide a high flow control effect and thus the bag main body 16 can be widely developed laterally in the early inflation stage.

Especially, according to the air bag 15, the back end 40*b* side of the cover sheet 40, at the inflation completed time of the air bag 15, is arranged at a position existing slightly backward from just above the hinge portion 6*c* of the opened door portion 6*a* of the air bag cover 6 (see FIG. 12). Thus, since, in the early inflation stage of the bag main body 16, the cover sheet 40 can be prevented from projecting backward greatly, the backward flow of the inflating gas G can be prevented as much as possible in the early inflation stage of the bag main body 16 and thus the inflating gas G can be deflected to flow toward the lateral direction, thereby providing a further higher flow control effect. Here, unless these aspects are considered, the length dimension of the cover sheet may be increased and the back end side may also be structured such that it is connected, for example, to the back side portion of the longitudinal tether.

Here, in this embodiment, the air bag 15 has a structure that the laterally central side of the passenger side wall portion 25 is recessed and the lateral-direction two sides thereof are projected to provide the recess section 26 and projecting sections 27L and 27R. However, the air bag to which the invention can be applied is not limited to the embodiment but the invention can also be applied to an air bag structured such that a passenger side wall portion has neither recess nor projection but is shaped flat for completion of inflation of the air bag.

What is claimed is:

1. A passenger seat air bag comprising:
   a bag main body to be folded and stored into a storage portion formed in an instrument panel arranged in front of the passenger seat of a vehicle and, when an inflating gas is supplied therein, inflatable so as to project toward the back side of the vehicle; and
   a tether, arranged within the bag main body, configured to restrict the shape of the bag main body in its inflation completed time, wherein:
   the bag main body includes a passenger side wall portion to be arranged substantially along the vertical direction on the back end side in the inflation completed time and a peripheral wall portion so shaped as to extend forward from the outer peripheral edge of the passenger side wall portion and converge toward the front end, the peripheral wall portion including on the front lower surface side thereof a gas supply opening so opened up as to enable the inflating gas to flow therethrough and having a peripheral edge mountable onto the storage portion side;
   the tether extends backward from the back rear edge side of the gas supply opening and has a back end side connected to the vicinity of the center of the passenger side wall portion in the inflation completed time to thereby restrict the distance of the passenger side wall portion from the gas supply opening in the inflation completed time of the bag main body; and a cover sheet formed of a belt-shaped flexible sheet member and capable of being arranged above the gas supply opening, the front end side of the cover sheet being connected to the front edge side of the gas supply opening, and the back end side thereof being connected to the tether, wherein the cover sheet has a front end side, and a back end side backward of the gas supply opening, the front end side of the cover sheet has a width dimension which is substantially constant up to a portion that covers a space above the gas supply opening, and the back end side of the cover sheet is smaller than the width of the front end side.

2. A passenger seat air bag according to claim 1, wherein the back end side of the cover sheet is connected to such an area of the tether as is arranged in a free space projected from the storage portion in the inflation completed time of the air bag.

3. A passenger seat air bag according to claim 2, wherein the cover sheet is structured such that the back end side thereof, in the inflation completed time of the air bag, is situated in the vicinity of a hinge portion serving as the center of rotation when opening a door section covering the air bag while it is folded and stored.

4. A passenger seat air bag according to claim 3, wherein substantially a whole of the front end side of the cover sheet is sewn to the front edge side of the peripheral edge of the gas supply opening using sewing threads, with the front edge of the cover sheet extending substantially along a lateral direction.

5. A passenger seat air bag according to claim 2, wherein substantially a whole of the front end side of the cover sheet is sewn to the front edge side of the peripheral edge of the gas supply opening using sewing threads, with the front edge of the cover sheet extending substantially along a lateral direction.

6. A passenger seat air bag according to claim 1, wherein substantially a whole of the front end side of the cover sheet is sewn to the front edge side of the peripheral edge of the gas supply opening using sewing threads, with the front edge of the cover sheet extending substantially along a lateral direction.

7. A passenger seat air bag according to claim 1, wherein a width dimension of the cover sheet is larger than an inside diameter dimension of the gas supply opening, and the width dimension of the cover sheet is substantially equal to a width dimension of a connecting section of a front side portion of the tether.

* * * * *